US010652487B2

(12) United States Patent
Hada (10) Patent No.: US 10,652,487 B2
(45) Date of Patent: May 12, 2020

(54) IMAGE PROCESSING APPARATUS AND IMAGE PROCESSING METHOD

(71) Applicants: Kabushiki Kaisha Toshiba, Minato-ku (JP); Toshiba Electronic Devices & Storage Corporation, Minato-ku (JP)

(72) Inventor: Ryuji Hada, Yokohama (JP)

(73) Assignees: Kabushiki Kaisha Toshiba, Minato-ku (JP); Toshiba Electronic Devices & Storage Corporation, Minato-ku (JP)

( * ) Notice: Subject to any disclaimer, the term of this patent is extended or adjusted under 35 U.S.C. 154(b) by 0 days.

(21) Appl. No.: 16/122,378

(22) Filed: Sep. 5, 2018

(65) Prior Publication Data

US 2019/0289231 A1    Sep. 19, 2019

(30) Foreign Application Priority Data

Mar. 15, 2018  (JP) ................. 2018-048345

(51) Int. Cl.
*H04N 5/357*    (2011.01)
*G06T 5/00*    (2006.01)
(Continued)

(52) U.S. Cl.
CPC ............. *H04N 5/357* (2013.01); *G06T 1/60* (2013.01); *G06T 3/0018* (2013.01); *G06T 5/006* (2013.01);
(Continued)

(58) Field of Classification Search
CPC .... H04N 5/357; H04N 5/23229; H04N 5/341; H04N 9/3185; G06T 1/60; G06T 5/006; G06T 3/0018
See application file for complete search history.

(56) References Cited

U.S. PATENT DOCUMENTS 7,499,082 B2   3/2009  Iga
8,503,817 B2   8/2013  Sasaki et al.
(Continued)

FOREIGN PATENT DOCUMENTS

JP   2005-229200   8/2005
JP   2007-79708   3/2007
(Continued)

OTHER PUBLICATIONS

Extended European Search Report dated Feb. 25, 2019 in European Patent Application No. 18192181.8, 7 pages.

*Primary Examiner* — Ahmed A Berhan
(74) *Attorney, Agent, or Firm* — Oblon, McClelland, Maier & Neustadt, L.L.P.

(57) ABSTRACT

An image processing apparatus of an embodiment includes: a distortion correction circuit configured to perform a correction operation to a plurality of pixels composing an input image; a plurality of output buffers layered to two or more stages configured to receive an output of the distortion correction circuit, and perform output for each transmission block which is a set of pixels with the consecutive corrected pixel positions; and a controller configured to write an output pixel of the distortion correction circuit in the first-stage output buffer, sequentially transfer the written pixel to a post-stage output buffer, and cause output buffers at respective stages to store pixels of sub-blocks into which the transmission block is divided.

16 Claims, 7 Drawing Sheets

(51) Int. Cl.
*G06T 3/00* (2006.01)
*G06T 1/60* (2006.01)
*H04N 5/341* (2011.01)
*H04N 5/232* (2006.01)

(52) U.S. Cl.
CPC ......... *H04N 5/23229* (2013.01); *H04N 5/341* (2013.01)

(56) References Cited

U.S. PATENT DOCUMENTS

| | | |
|---|---|---|
| 8,724,923 B2 | 5/2014 | Nakazono et al. |
| 2007/0211960 A1 * | 9/2007 | Sasaki ................... G06T 5/006 382/275 |
| 2007/0252905 A1 | 11/2007 | Kamiya et al. |
| 2009/0087115 A1 | 4/2009 | Wong et al. |
| 2009/0190856 A1 | 7/2009 | Omori |
| 2017/0330306 A1 | 11/2017 | Wu et al. |

FOREIGN PATENT DOCUMENTS

| | | |
|---|---|---|
| JP | 2007-293457 | 11/2007 |
| JP | 2010-28758 | 2/2010 |
| JP | 2014-35589 | 2/2014 |
| JP | 5602532 | 10/2014 |

* cited by examiner

IMAGE PROCESSING APPARATUS AND IMAGE PROCESSING METHOD

CROSS REFERENCE TO RELATED APPLICATION

This application is based upon and claims the benefit of priority from the prior Japanese Patent Application No. 2018-048345 filed in Japan on Mar. 15, 2018; the entire contents of which are incorporated herein by reference.

FIELD

An embodiment of the present invention relates to an image processing apparatus and an image processing method.

BACKGROUND

In general, an image obtained by picking up an image of an object with an image pickup apparatus such as a digital camera is affected by distortion aberration or magnification chromatic aberration of an optical system such as an image pickup lens. For example, in a case where an image acquired by an image pickup apparatus is used for car collision prevention or the like, or is used for a surveillance camera, an ultrawide-angle lens may be adopted for the purpose, and distortion aberration or magnification chromatic aberration tends to increase.

Although lens material is devised or an aspherical lens is used to suppress distortion aberration, a problem is that a cost for design or manufacture increases. Since many sets of lenses made of materials with different refractive indices are used to suppress magnification chromatic aberration, a problem is that the number of lenses increases, and the apparatus grows in size or the manufacturing cost increases.

In recent years, as a solution to the problems, when an image is distorted due to distortion aberration or magnification chromatic aberration, an image processing apparatus for electrically correcting distortion of the image generated in an optical system has been used.

Since corrected output pixels are outputted in raster scan order in the electrical correction method in a conventional image processing apparatus, an input pixel position necessary for correction has been calculated from an output pixel position. However, when distortion of an image is large, the output pixel position and the input pixel position have a large deviation. Accordingly, since it is necessary to prepare many line buffers to hold input pixels, the apparatus grows in size. In general, although the line buffers are composed of an SRAM, a problem is that an SRAM is expensive, so that a manufacturing cost increases.

DETAILED DESCRIPTION

An image processing apparatus of an embodiment includes: a distortion correction circuit to which a plurality of pixels composing an input image are inputted in raster scan order, and which is configured to perform a correction operation for correcting positions of the pixels based on distortion of the input image, attach information on corrected pixel positions obtained as a result of the correction operation to the pixels, and output the pixels in the raster scan order; a plurality of output buffers layered to two or more stages to which an output of the distortion correction circuit is inputted, and which are configured to perform output for each transmission block which is a set of pixels with the consecutive corrected pixel positions; and a controller configured to write an output pixel of the distortion correction circuit in a first-stage output buffer of the plurality of output buffers, sequentially transfer the written pixel to a post-stage output buffer, and cause output buffers at respective stages to store pixels of sub-blocks into which the transmission block is divided.

An embodiment of the present invention will be described below in detail with reference to the drawings.

Figure 1:
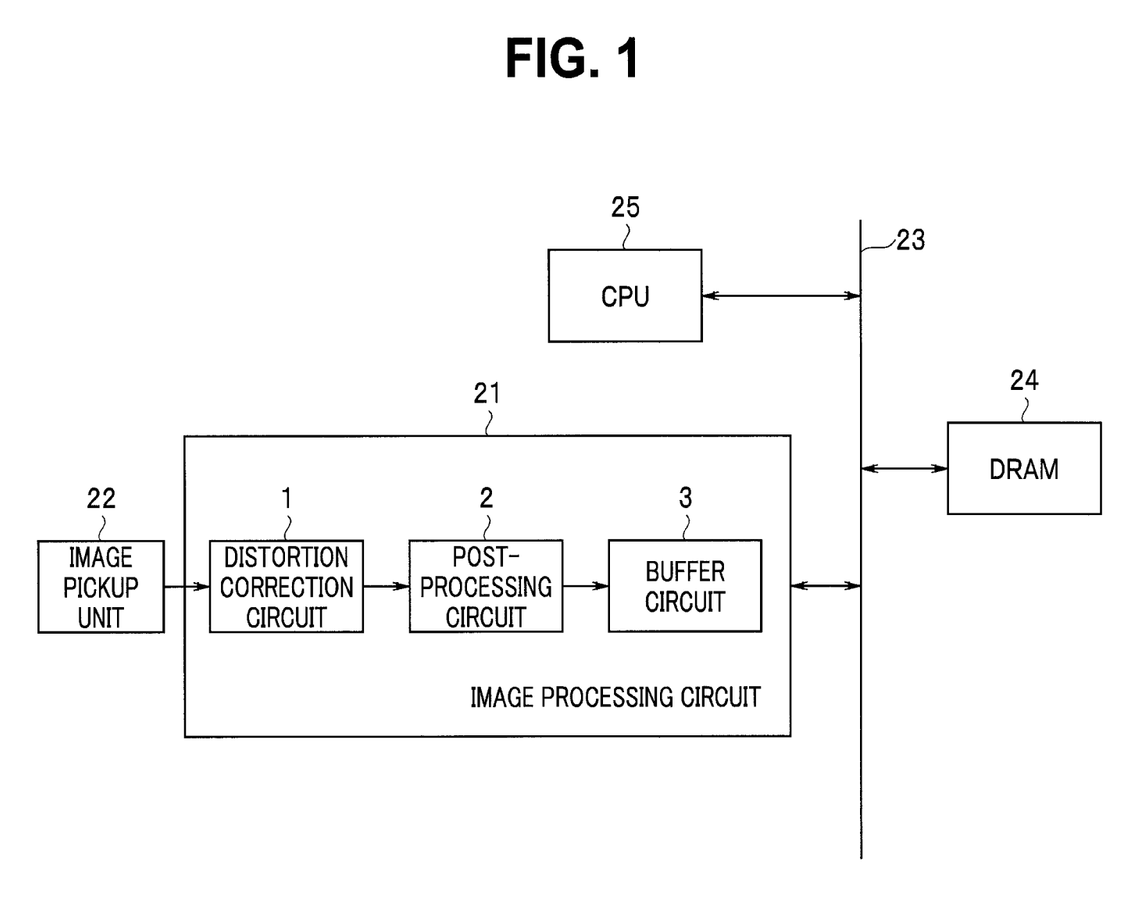
FIG. 1 is a block diagram showing an image processing apparatus according to an embodiment of the present invention.

FIG. 1 is a block diagram showing an image processing apparatus according to an embodiment of the present invention. The embodiment adopts raster scan input and random output for reducing line buffer capacity in distortion correction processing. The embodiment makes it possible to reduce a buffer size (capacity) and improve transmission efficiency by multilayering an output buffer in distortion correction based on the raster scan input and random output.

The image processing apparatus in FIG. 1 includes a CPU 25. The CPU 25 is configured to operate according to a program stored in a memory not shown to control each unit. An image pickup unit 22 includes an image pickup device not shown such as a CMOS sensor. The image pickup unit 22 photoelectrically converts an optical image incident through an optical system not shown with the image pickup device to acquire an image pickup signal (a picked-up image). An output (picked-up image) of the image pickup unit 22 is given to an image processing circuit 21 to be distortion-corrected by the image processing circuit 21, and is then given to a DRAM 24 via a bus 23 to be stored. The picked-up image from the image pickup unit 22 has distortion due to distortion aberration or the like of the optical system, and the image processing circuit 21 performs various types of image processing such as correction of distortion aberration.

The image pickup output in raster scan order from the image pickup unit 22 is inputted to a distortion correction circuit 1 composing the image processing circuit 21. The distortion correction circuit 1 performs distortion correction and magnification chromatic aberration correction on the inputted picked-up image for output to a post-processing circuit 2. The post-processing circuit 2 performs gamma correction and color space correction on the inputted image and outputs the image to a buffer circuit 3. The buffer circuit 3 temporarily holds the inputted image and outputs the image to the DRAM 24 via the bus 23. Thus, a distortion-corrected image is stored in the DRAM 24.

As described above, in the distortion correction of the related art, image pickup outputs inputted in raster scan order are temporarily accumulated in line buffers, and are sequentially written in a DRAM in raster scan output order. In outputting in raster order (raster scan output), a distortion correction circuit in the related art calculates an original pixel position in a case where the output pixel is not distorted, and reads a pixel at the calculated pixel position from the line buffers and transfers the pixel to the DRAM. In raster scan input and raster scan output of the related art, the pixel at the pixel position calculated in outputting the pixel needs to be stored in the line buffers, and sufficient capacity corresponding to a size of distortion needs to be secured as the line buffers.

The embodiment adopts distortion correction processing for reducing line buffers by adopting raster scan input and random output. In the raster scan input and random output adopted in the embodiment, control is performed so that an inputted pixel is stored at an address in the DRAM corresponding to an original pixel position in a case where the pixel is not distorted (hereinafter referred to as a corrected pixel position). Accordingly, as a line buffer, one having a relatively small capacity can be adopted.

First, distortion correction processing based on raster scan input and random output adopted in the embodiment will be specifically described with reference to FIG. 2 and FIG. 3.

Figure 2:
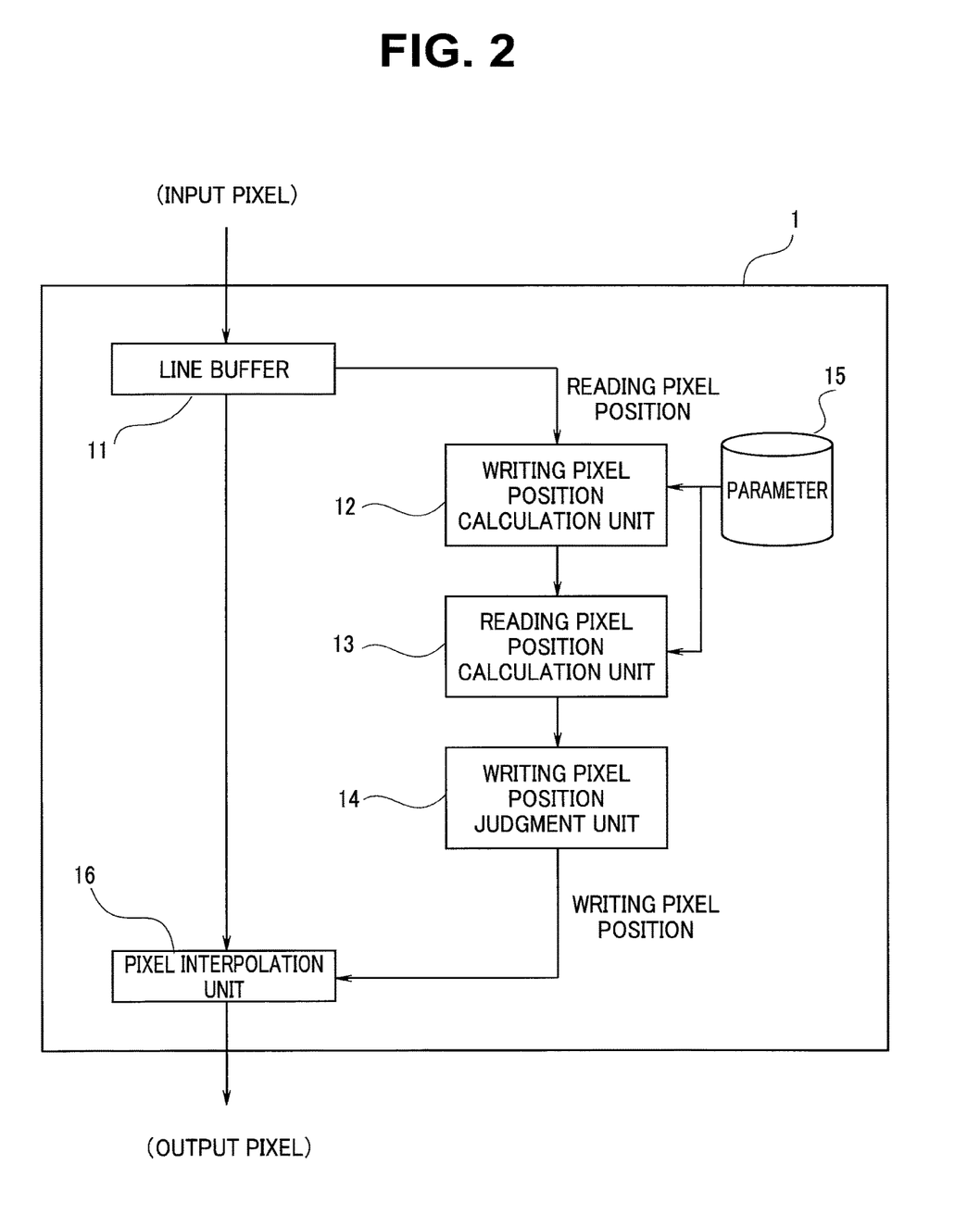
FIG. 2 is a block diagram showing an example of a specific configuration of the distortion correction circuit 1 in FIG. 1.
Figure 3:
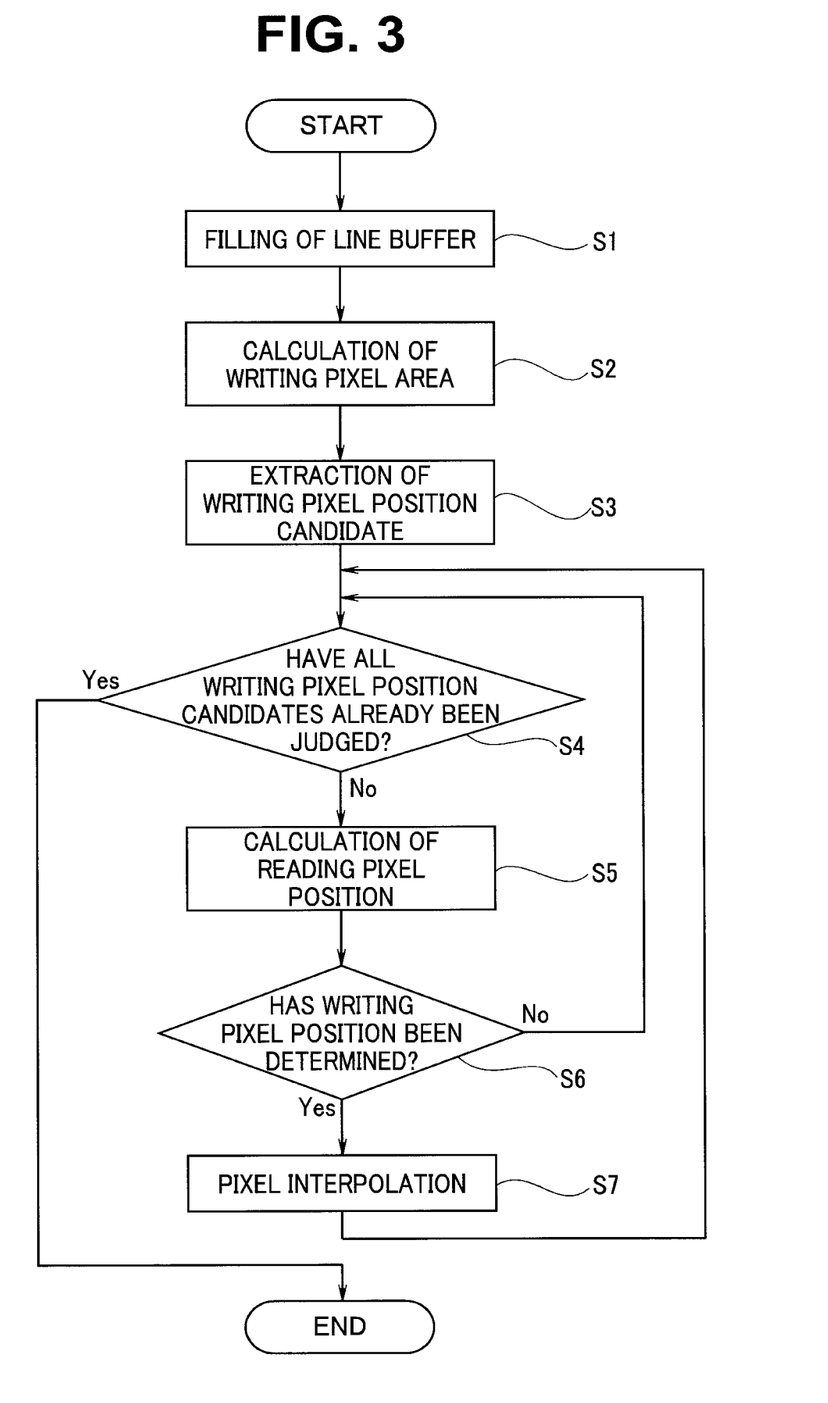
FIG. 3 is a flowchart for explaining image correction processing.

FIG. 2 is a block diagram showing an example of a specific configuration of the distortion correction circuit 1 in FIG. 1.

In FIG. 2, the distortion correction circuit 1 is mainly composed of a line buffer 11, a writing pixel position calculation unit 12, a reading pixel position calculation unit 13, a writing pixel position judgment unit 14, a parameter storage unit 15, and a pixel interpolation unit 16.

The line buffer 11 holds pixels of an input image read from the image pickup unit 22 in raster scan order by the number of lines necessary for correction processing. For example, when bilinear interpolation is used to correct distortion aberration, pixels for 1-2 lines are hold.

The writing pixel position calculation unit 12 calculates a writing pixel area estimated to include a pixel interpolated using a reading pixel Pi to be corrected. More specifically, a reading pixel position set is defined which is composed of four peripheral pixels {Pi0(vo, ho), Pi1(vo, ho−1), Pi2(vo−1, ho−1), Pi3(vo−1, ho)} including the position (vo, ho) of the reading pixel Pi (hereinafter referred to as a pixel Pi(vo, ho)). Note that in the description, regarding a pixel position coordinate (v, h), upper left of an image is set as an origin (0, 0), v is a vertical pixel position, and h is a horizontal pixel position.

For each of the reading pixels Pi0, Pi1, Pi2, and Pi3, a function for pixel position calculation is used to calculate positions (vo', ho'), (vo', ho−1'), (vo−1', ho−1'), and (vo−1', ho') of corresponding writing pixels Po0, Po1, Po2, and Po3. A rectangular area with the four pixels Po0(vo', ho'), Po1(vo', ho−1'), Po2(vo−1', ho−1'), and Po3(vo−1', ho') as vertices is the writing pixel area.

For the pixel position calculation, a general function for pixel position calculation can be used such as a function represented by a polynomial or grid table conversion. But as a pixel position calculation function, one having an inverse function is used.

The reading pixel position calculation unit 13 extracts a position of a pixel, both a vertical position and a horizontal position of which are integers, in the writing pixel area (a writing pixel candidate Poc(v', h')). A reading pixel Pi(v'', h'') corresponding to the writing pixel candidate Poc(v', h') is calculated by performing pixel position calculation. Note that the pixel position calculation is performed using an inverse function of the pixel position calculation performed in the writing pixel position calculation unit 12. When a plurality of candidates exist, a reading pixel Pi(v'', h'') is calculated for all candidates Poc(v', h').

When the reading pixel Pi(v'', h'') is included in the set, the writing pixel position judgment unit 14 determines a writing pixel candidate Poc(v', h') corresponding to the pixel Pi(v'', h'') as a writing pixel Po(v', h') at the corrected pixel position.

The parameter storage unit 15 stores a parameter to be used for pixel position calculation function in the writing pixel position calculation unit 12 and the reading pixel position calculation unit 13.

The pixel interpolation unit 16 calculates a pixel value of the reading pixel Pi(v'', h'') corresponding to the determined writing pixel Po(v', h'). Normally, since coordinates of the reading pixel Pi(v'', h'') are non-integers, an existing interpolation approach such as bilinear interpolation using four peripheral pixels is used to calculate the pixel value. As the pixel value of the writing pixel Po(v', h'), the calculated pixel value is outputted. The outputted pixel value is stored in a memory (not shown) such as a DRAM. Note that since output pixels are outputted in order of correction, the positions of the output pixels (corrected pixel positions) are random.

Next, a procedure of image correction processing in the distortion correction circuit 1 will be described. FIG. 3 is a flowchart for explaining image correction processing.

First, the line buffer 11 (S1) is filled with pixels inputted to the distortion correction circuit 1 in raster scan order. The line buffer 11 stores input pixels by the number of lines necessary for processing in the pixel interpolation unit 16. For example, when bilinear interpolation is used, pixel values of 2×2 peripheral pixels (four pixels) of an interpolation target pixel are necessary, so that pixel values for at least one line+one pixel are stored.

Next, a reading pixel Pi(vo, ho) which is a correction target pixel is specified, and a writing pixel area estimated to include a pixel interpolated using the reading pixel Pi is calculated (S2). More specifically, at first, a set is defined which is composed of four peripheral pixels {Pi0(vo, ho), Pi1(vo, ho−1), Pi2(vo−1, ho−1), Pi3(vo−1, ho)} including the reading pixel Pi(vo, ho). That is, Pi1(vo, ho−1) is a left adjacent pixel of Pi(vo, ho), Pi2(vo−1, ho−1) is an upper left pixel of Pi(vo, ho), and Pi3(vo−1, ho) is an upper pixel of Pi(vo, ho). Next, for each of the pixels Pi0, Pi1, Pi2, and Pi3, pixel position calculation is performed to calculate corresponding writing pixels Po0(vo', ho'), Po1(vo', ho−1'), Po2 (vo−1', ho−1'), and Po3(vo−1', ho').

For example, when a function represented by a polynomial is used, pixel position calculation is performed in a next procedure.

(a) Calculation of image height: The position of an input pixel is converted from a (v, h) coordinate system with an origin at upper left to an (x, y) coordinate system with an origin at an optical center. Note that in both the coordinate systems, the right side is positive in the horizontal direction, and the lower side is positive in the vertical direction. A distance (image height) r from the optical center to the input pixel is calculated. The calculation is performed using Equations (1)-(3) shown below.

$$y = v_{in} + [\text{SENSOR\_CROP\_OFS\_V}] \quad \text{Equation (1)}$$

$$x = h_{in} + [\text{SENSOR\_CROP\_OFS\_H}] \quad \text{Equation (2)}$$

$$r = \sqrt{x^2 + y^2} * [\text{NORM\_SCALE}] \quad \text{Equation (3)}$$

In Equation (1), $v_{in}$ is an input pixel position (non-negative number) in the vertical direction, and [SENSOR_CROP_OFS_V] is a vertical pixel position offset from the optical center (an offset in the vertical direction between the optical center and the origin of the (v, h) coordinate system). In Equation (2), $h_{in}$ is the input pixel position (non-negative number) in the horizontal direction, and [SENSOR_CROP_OFS_H] is a horizontal pixel position offset from the optical center (an offset in the horizontal direction between the optical center and the origin of the (v, h) coordinate system). In Equation (3), [NORM_SCALE] is a normalization factor (non-negative number).

Note that when the image center matches the optical center, [SENSOR_CROP_OFS_V] and [SENSOR_CROP_OFS_H] are calculated by Equations (4) and (5) below.

$$[\text{SENSOR\_CROP\_OFS\_V}] = -(\text{vertical size of input image}/2 - 0.5) \quad \text{Equation (4)}$$

$$[\text{SENSOR\_CROP\_OFS\_H}] = -(\text{horizontal size of input image}/2 - 0.5) \quad \text{Equation (5)}$$

(b) Calculation of an image height scale in pixel position calculation: A distance r_scale by which a point at a distance r from the optical center is moved in the optical center direction by pixel position conversion is calculated. The calculation is performed using Equation (6) shown below.

$$r\_scale = P0 + P1*r + P2*r^2 + P3*r^3 + P4*r^4 + P5*r^5 + P6*r^6 + P7*r^7 + P8*r^8 + P9*r^9 + P10*r^{10} \quad \text{Equation (6)}$$

In Equation (6), Px (x=0 to 10) is a polynomial coefficient corresponding to each degree.

(c) Calculation of an output pixel position: The image height scale is used to convert the input pixel position into the output pixel position for return to the (v, h) coordinate system. The calculation is performed using Equations (7) and (8) shown below.

$$v_{out} = r\_scale*y - [\text{SENSOR\_CROP\_OFS\_V}] \quad \text{Equation (7)}$$

$$h_{out} = r\_scale*x - [\text{SENSOR\_CROP\_OFS\_H}] \quad \text{Equation (8)}$$

In Equation (7), $v_{out}$ is the output pixel position (non-negative number) in the vertical direction, and in Equation (8), $h_{out}$ is the output pixel position (non-negative number) in the horizontal direction.

That is, by the series of steps from (a) to (c), the reading pixels Pi0(vo, ho), Pi1(vo, ho-1), Pi2(vo-1, ho-1), and Pi3(vo-1, ho) are converted to the writing pixels Po0(vo', ho'), Po1(vo', ho-1'), Po2(vo-1', ho-1'), and Po3(vo-1', ho'), respectively.

Note that when a function represented by a polynomial as described above is used as pixel position calculation, it is assumed that each parameter of [SENSOR_CROP_OFS_V], [SENSOR_CROP_OFS_H], [NORM_SCALE], and Px(x=0 to 10) is set in advance, and is stored in the parameter storage unit 15.

The pixel position calculation can also be performed using grid table conversion. A grid table is a two-dimensional address table with a pixel position (v, h) as a grid node. Each grid node stores a pixel position of a conversion destination. An address corresponding to any pixel position positioned between grid nodes is calculated by interpolation from neighbor grid nodes. When grid table conversion is used as pixel position calculation, the following procedure is used.

(d) Calculation of a reference grid node: A grid node positioned at upper left of an input pixel is determined as a reference grid node. The calculation is performed using Equations (9) and (10) shown below.

$$\text{ref\_v} = v_{in} * \text{GRID\_PATCH\_VSIZE\_INV} \quad \text{Equation (9)}$$

$$\text{ref\_h} = h_{in} * \text{GRID\_PATCH\_HSIZE\_INV} \quad \text{Equation (10)}$$

In Equation (9), $v_{in}$ is the input pixel position (non-negative number) in the vertical direction, and GRID_PATCH_VSIZE_INV is a reciprocal of a distance between vertical grid nodes.

GRID_PATCH_VSIZE_INV is calculated using Equation (11) below.

$$\text{GRID\_PATCH\_VSIZE\_INV} = \frac{1}{([\text{SENSOR\_CROP\_VSIDE}] - 1) / ([\text{GRID\_NODE\_NUM\_V}] - 1)} \quad \text{Equation (11)}$$

In Equation (11), [SENSOR_CROP_VSIZE] is a vertical size of the input image, and [GRID_NODE_NUM_V] is the number of vertical grid nodes.

In Equation (10), $h_{in}$ is the input pixel position (non-negative number) in the horizontal direction, and GRID_PATCH_HSIZE_INV is a reciprocal of a distance between horizontal grid nodes. GRID_PATCH_HSIZE_INV is calculated using Equation (12) below.

$$\text{GRID\_PATCH\_HSIZE\_INV} = \frac{1}{([\text{SENSOR\_CROP\_HSIDE}] - 1) / ([\text{GRID\_NODE\_NUM\_H}] - 1)} \quad \text{Equation (12)}$$

In Equation (12), [SENSOR_CROS_HSIZE] is a horizontal size of the input image, and [GRID_NODE_NUM_H] is the number of horizontal grid nodes.

(e) Calculation of weights: Weights are calculated which are based on ratios of distances in the vertical direction and the horizontal direction with respect to four peripheral grid nodes including the reference grid node from the input pixel position. The calculation is performed using Equations (13) and (14) shown below.

$$\text{weight\_v} = \text{ref\_v} - [\text{ref\_v}] \quad \text{Equation (13)}$$

$$\text{weight\_h} = \text{ref\_h} - [\text{ref\_h}] \quad \text{Equation (14)}$$

In Equations (13) and (14), [ ] denotes a Gauss symbol. The weight in the vertical direction associated with the reference grid node is 1−weight_v. The weight in the horizontal direction associated with the reference grid node is 1−weight_h.

(f) Calculation of the output pixel position: A table of four peripheral grid nodes including the reference grid node, and the weight of each grid node with respect to the input pixel position are used to calculate the output pixel position based on bilinear interpolation.

(f-1) Calculation of the output pixel position in the vertical direction

The calculation is performed using Equations (15)-(17) shown below.

$$v0_{out}=\text{table\_}v(\text{ref\_}v,\text{ref\_}h)*(1-\text{weight\_}h)+\text{table\_}v(\text{ref\_}v,\text{ref\_}h+1)*\text{weight\_}h \quad \text{Equation (15)}$$

$$v1_{out}=\text{table\_}v(\text{ref\_}v+1,\text{ref\_}h)*(1-\text{weight\_}h)+\text{table\_}v(\text{ref\_}v+1,\text{ref\_}h+1)*\text{weight\_}h \quad \text{Equation (16)}$$

$$v_{out}=v0_{out}*(1-\text{weight\_}v)+v1_{out}*\text{weight\_}v \quad \text{Equation (17)}$$

In Equations (15) and (16), table_v(v, h) is a vertical pixel position grid table. In Equation (17), $v_{out}$ is the output pixel position (non-negative number) in the vertical direction.

(f-2) Calculation of the output pixel position in the horizontal direction

The calculation is performed using Equations (18)-(20) shown below.

$$h0_{out}=\text{table\_}h(\text{ref\_}v,\text{ref\_}h)*(1-\text{weight\_}h)+\text{table\_}h(\text{ref\_}v,\text{ref\_}h+1)*\text{weight\_}h \quad \text{Equation (18)}$$

$$h1_{out}=\text{table\_}h(\text{ref\_}v+1,\text{ref\_}h)*(1-\text{weight\_}h)+\text{table\_}h(\text{ref\_}v+1,\text{ref\_}h+1)*\text{weight\_}h \quad \text{Equation (19)}$$

$$h_{out}=h0_{out}*(1-\text{weight\_}h)+h1_{out}*\text{weight\_}v \quad \text{Equation (20)}$$

In Equations (18) and (19), table_h(v, h) is a horizontal pixel position grid table. In Equation (20), $h_{out}$ is the output pixel position (non-negative number) in the horizontal direction.

That is, by the series of steps from (d) to (f), the reading pixels Pi0(vo, ho), Pi1(vo, ho−1), Pi2(vo−1, ho−1), and Pi3(vo−1, ho) are converted into the writing pixels Po0(vo', ho'), Po1(vo', ho−1'), Po2(vo−1', ho−1'), and Po3(vo−1', ho'), respectively.

Note that when grid table conversion as described above is used as pixel position calculation, it is assumed that each parameter of [SENSOR_CROP_VSIZE], [GRID_NODE_NUM_V], [SENSOR_CROP_HSIZE], [GRID_NODE_NUM_H], table_v(v, h), and table_h(v, h) is set in advance, and is stored in the parameter storage unit 15.

A rectangular area with the four pixels Po0(vo', ho'), Po1(vo', ho−1'), Po2(vo−1', ho−1'), Po3(vo−1', ho') calculated by pixel position calculation as vertices is specified as a writing pixel area.

Next, a pixel position (a writing pixel candidate Poc(v', h')), both a vertical coordinate and a horizontal coordinate of which are integers, is extracted in the specified rectangular area. For example, each coordinate of the pixels Po0(vo', ho'), Po1(vo', ho−1'), Po2(vo−1', ho−1'), Po3(vo−1', ho') is rounded up/rounded down to be adjusted/converted into an integer, and all pixel positions in a rectangular area circumscribed to the obtained pixel positions are regarded as writing pixel candidates Poc(v', h') (S3). Adjustment/conversion into an integer by rounding up/rounding down is performed using Equations (21) and (22) shown below. Note that among the four points, Equation (21) is used for a pixel positioned on the left or upper side, and Equation (22) is used for a pixel positioned on the right or lower side.

$$\text{adjusted pixel position}=[\text{writing pixel position}-\text{WRITE\_AREA\_DELTA}] \quad \text{Equation (21)}$$

$$\text{adjusted pixel position}=[\text{writing pixel position}+\text{WRITE\_AREA\_DELTA}] \quad \text{Equation (22)}$$

In Equations (21) and (22), WRITE_AREA_DELTA is an adjustment value for conversion into an integer, and is a value set in advance. [ ] denotes a Gauss symbol.

Subsequently, all the writing pixel candidates Poc(v', h') calculated in S3 are judged as to whether to be a writing pixel Po(v', h') or not. When an unjudged writing pixel candidate Poc(v', h') exists (S4, No), a corresponding reading pixel Pi(v", h") is calculated by pixel position calculation (S5). The pixel position calculation is performed using an inverse function of pixel position calculation used in S2. At the time, the vertical coordinate and horizontal coordinate of Pi(v", h") are non-integers.

Next, pixels necessary to calculate a pixel value of Pi(v", h") by interpolation are specified. For example, when the pixel value is calculated using bilinear interpolation, four peripheral pixels of Pi(v", h") are pixels necessary for interpolation. When all pixels necessary for interpolation are included in the set, a writing pixel candidate Poc(v', h') corresponding to the reading pixel Pi(v", h") is determined as a writing pixel Po(v', h') (S5, Yes).

In the present case, a pixel value of the determined writing pixel Po(v', h') is outputted by calculating a pixel value of a corresponding reading pixel Pi(v", h") using pixel interpolation (S6). Note that output pixels Po(v', h') are not in raster scan order but random. Subsequently, a return is made to S4 to check whether an unjudged writing pixel candidate Poc(v', h') exists or not.

When a pixel not included in the set exists among pixels necessary for interpolation, a writing pixel candidate Poc(v', h') corresponding to the reading pixel Pi(v", h") is determined not to be a writing pixel Po(v', h') (S5, No). In the present case, pixel interpolation is not performed, and a return is made to S4 to check whether an unjudged writing pixel candidate Poc(v', h') exists or not.

In S4, when all the writing pixel candidates Poc(v', h') calculated in S3 have been judged, the series of steps of the image correction processing is ended.

Thus, in the distortion correction processing by the distortion correction circuit 1 of the embodiment, input pixels read from the image pickup unit 22 in raster scan order are subjected to correction processing in the order. Accordingly, since a range of input pixels necessary for correction can be suppressed to about one to several lines, a mounted amount of the line buffer 11 for storing input pixels can be reduced, so that a manufacturing cost can be suppressed.

Note that the mounted amount of the line buffer 11 is set depending on an approach of pixel interpolation. For example, when a bilinear method is used, about two lines should just be mounted, but when a bicubic method is used, about four lines need to be mounted.

A method of pixel position calculation for calculating a writing pixel from a reading pixel is not limited to the above method. That is, any method can be used as long as being a method for which an inverse function exists. A plurality of pixel position calculation methods may be used in combination.

(Multilayering of an Output Buffer)

A pixel value of each pixel outputted from the distortion correction circuit 1 is supplied to the post-processing circuit 2, and the post-processing circuit 2 performs gamma correction and color space correction on each input pixel for output to the buffer circuit 3. The buffer circuit 3 temporarily holds the inputted image for output to the DRAM 24 via the bus 23. Thus, a distortion-corrected image is stored in the DRAM 24.

In general, transfer to the DRAM is performed in predetermined transmission units in consideration of transmission efficiency. Since output is performed in raster scan order in the distortion correction processing based on raster scan input and raster scan output in the related art, it suffices to sequentially accumulate pixels in raster scan order in an output buffer, and perform transfer to the DRAM each time pixels for one line are accumulated, for example.

However, since outputs are not in raster scan order but random in a case of distortion correction processing based on raster scan input and random output, for example, a plurality of output buffers in transmission units are prepared, and transfer to the DRAM is performed each time pixels in raster scan order are accumulated in each buffer.

In the embodiment, the buffer circuit 3 is composed of a multilayered output buffer in consideration of transmission efficiency and buffer capacity. First, basic operation of an unmultilayered output buffer will be described with reference to the explanatory diagram in FIG. 4.

Figure 4:
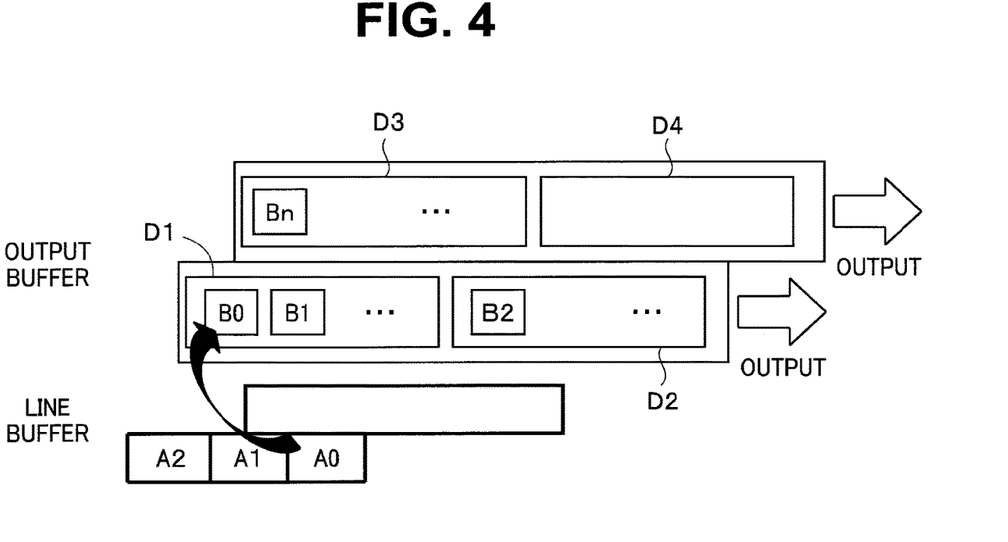
FIG. 4 is an explanatory diagram for explaining the buffer circuit 3 in FIG. 1.

The line buffer in FIG. 4 corresponds to the line buffer 11 in FIG. 2. Pixels A0, A1, A2 . . . are sequentially written in the line buffer 11 in raster scan order. For a pixel written in the line buffer 11, a corrected pixel position is determined by the distortion correction circuit 1. The output buffer in FIG. 4 has a plurality of areas D1, D2, . . . (hereinafter referred to as an area D when the areas need not to be distinguished) in each predetermined transmission unit (e.g., 64 bytes). Transfer to the DRAM 24 is performed in each transmission unit. Accordingly, each time pixel values in raster scan order are stored at all addresses in each area D in the output buffer, the pixel values are outputted from each area D to be transferred to the DRAM 24. Note that each area D in the output buffer is given an address corresponding to a corrected pixel position of a pixel written first, and pixels stored in each area D are written at corresponding addresses in the DRAM 24.

For example, in a case where the corrected pixel positions of the pixels A0 and A1 are consecutive, when the pixel A0 is written at a head position of the area D1 in the output buffer as a pixel B0, a pixel B1 corresponding to the next pixel A1 is written at a position of address next to an address where the pixel B0 is stored. However, when the corrected pixel position of the pixel A2 is apart from the corrected pixel position of the pixel A1 in excess of pixel positions for the number of pixels storable in the area D1, a pixel B2 corresponding to the pixel A2 is written in an area other than the area D1. In the example in FIG. 4, the pixel B2 corresponding to the pixel A2 is stored in the area D2 in the output buffer. Note that it is shown that a pixel Bn corresponding to a pixel An is stored in an area D3.

Thus, when distortion correction processing based on raster scan input and random output is performed, pixels are not necessarily sequentially written at consecutive addresses in the output buffer, so that use efficiency of the output buffer decreases. When an output buffer size of a transmission unit is reduced to improve the use efficiency of the output buffer, an occupancy rate of DRAM transfer increases, so that transmission efficiency decreases. For example, when an output buffer with a size of 64 bytes is adopted, transmission efficiency decreases to about 30% at a time of raster scan input and raster scan output. Therefore, an occupancy rate of DRAM transfer by the image processing circuit 21 increases, so that it takes a long time period for other processing such as image analysis. Conversely, when an attempt is made to improve transmission efficiency, a total output buffer size increases as a result.

In the embodiment, use efficiency of the entire output buffer is improved by multilayering an output buffer depending on property of lens distortion. Thus, it is tried to reduce an output buffer size, and improve transmission efficiency of DRAM transfer.

Figure 5:
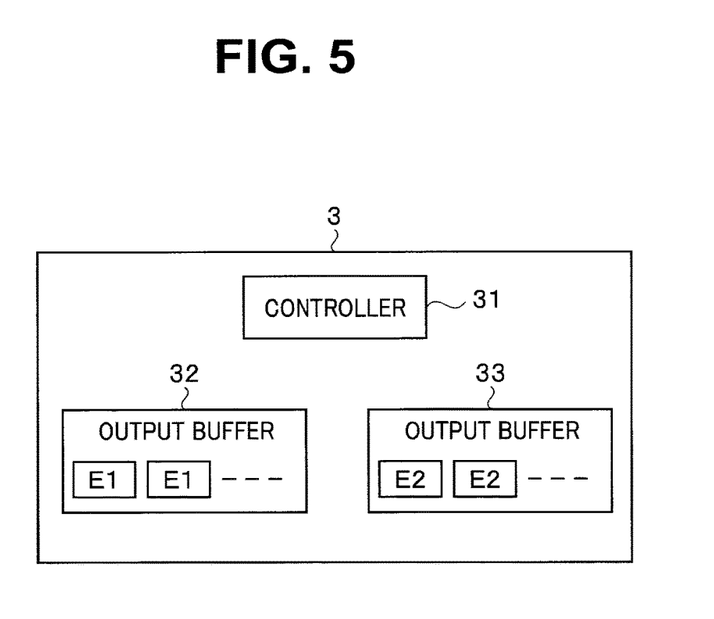
FIG. 5 is a block diagram showing an example of a specific configuration of the buffer circuit 3 in FIG. 1.

FIG. 5 is a block diagram showing an example of a specific configuration of the buffer circuit 3 in FIG. 1. Although the example in FIG. 5 shows an example in which an output buffer is multilayered to two stages, multilayering to three or more stages is also possible.

In FIG. 5, the buffer circuit 3 includes a controller 31 and output buffers 32 and 33. The output buffer 32 is a first-stage output buffer, and the output buffer 33 is a second-stage output buffer. The controller 31 controls writing in and reading from the output buffers 32 and 33.

The output buffer 32 has a plurality of areas E1 with a predetermined capacity, and the output buffer 33 has a plurality of areas E2 with a predetermined capacity. The capacities of the areas E1 and E2 are settable independently. For example, a capacity obtained by adding the capacity of the area E1 and the capacity of the area E2 is set to the capacity of a transmission unit.

For example, if both the capacities of the areas E1 and E2 are 64 bytes, when one pixel is 16-bit data, 32 pixels can be stored in each area E1, E2, and when one pixel is 8-bit data, 64 pixels can be stored in each area E1, E2. Hereinafter, a set of a series of pixels with consecutive corrected pixel positions stored in each area E1 or E2 will be referred to as a sub-block, and a set of a series of pixels in a transmission unit with consecutive corrected pixel positions stored in the two areas E1 and E2 will be referred to as a transmission block. Note that when an output buffer is composed of three or more stages, a set of a series of pixels in a transmission unit with consecutive corrected pixel positions stored in the three or more stages of output buffers will be referred to as a transmission block.

The controller 31 first gives each pixel outputted from the post-processing circuit 2 in random order to any area E1 of the plurality of areas E1 in the output buffer 32. Each area E1 in the output buffer 32 is given tag information corresponding to a corrected pixel position of a pixel written first. The controller 31 writes pixels with consecutive corrected pixel positions at consecutive addresses in each area E1. That is, when the capacity of an area E1 is 64 bytes and one pixel is 16-bit data, pixels corresponding to 32 pixels with consecutive corrected pixel positions are stored in each area E1. For example, when a transmission block which is a transmission unit is composed of 64 pixels, a sub-block of half pixels of a transmission block can be stored in an area E1. The controller 31 judges for each area E1 in the output buffer 32 whether pixels have been stored at all addresses in the area or not. Hereinafter, it is also referred to as filling completion that all data in a sub-block have been stored in each area E1, the controller 31 transfers stored pixels of a sub-block for each completely filled area E1 to the output buffer 33 at a later stage.

Also each area E2 in the output buffer 33 is given tag information corresponding to a corrected pixel position of a pixel written first. The controller 31 writes pixels with consecutive corrected pixel positions at consecutive addresses in each area E2. That is, for example, when the capacity of an area E2 is 64 bytes and one pixel is 16-bit data, pixels for 32 pixels with consecutive corrected pixel positions are stored in each area E2. When one transmission block is composed of 64 pixels, sub-blocks stored in the areas E1 and E2 can be concatenated to obtain pixels of a transmission block. The controller 31 judges whether each area E2 in the output buffer 33 has been completely filled or not. In a case where an area E2 has been completely filled, upon entering a state where all data of a transmission block have been stored with pixels stored in the area E2 and pixels stored in an area E1 storing pixels with corrected pixel positions consecutive with the pixels (hereinafter referred to as filling completion also in the case), the controller 31 transfers all pixels stored in the areas E1 and E2, that is, a plurality of pixels in a transmission unit with consecutive corrected pixel positions (all pixels in a transmission block) to the DRAM 24 via the bus 23 for storage.

Figure 6:
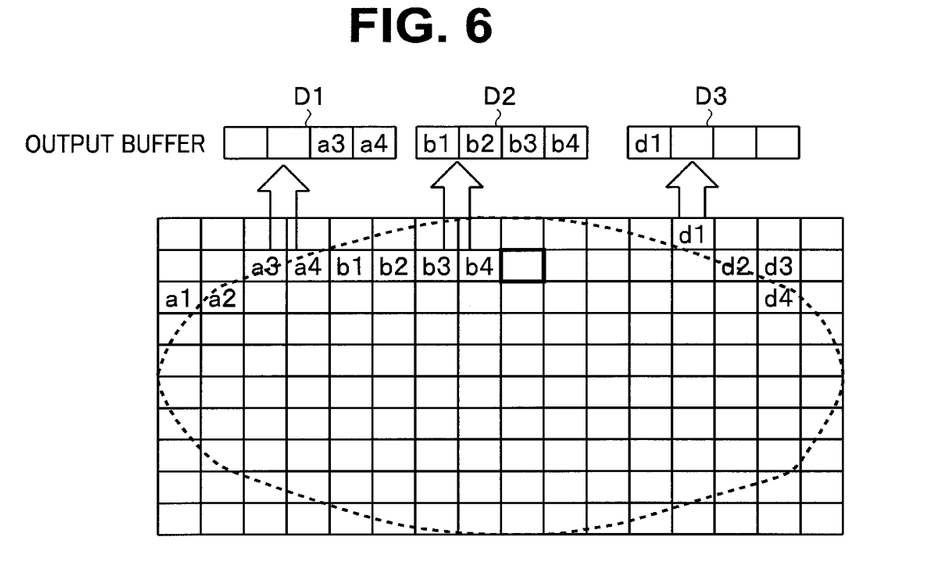
FIG. 6 is an explanatory diagram for explaining writing in and reading from an output buffer in a case of not being multilayered.
Figure 7:
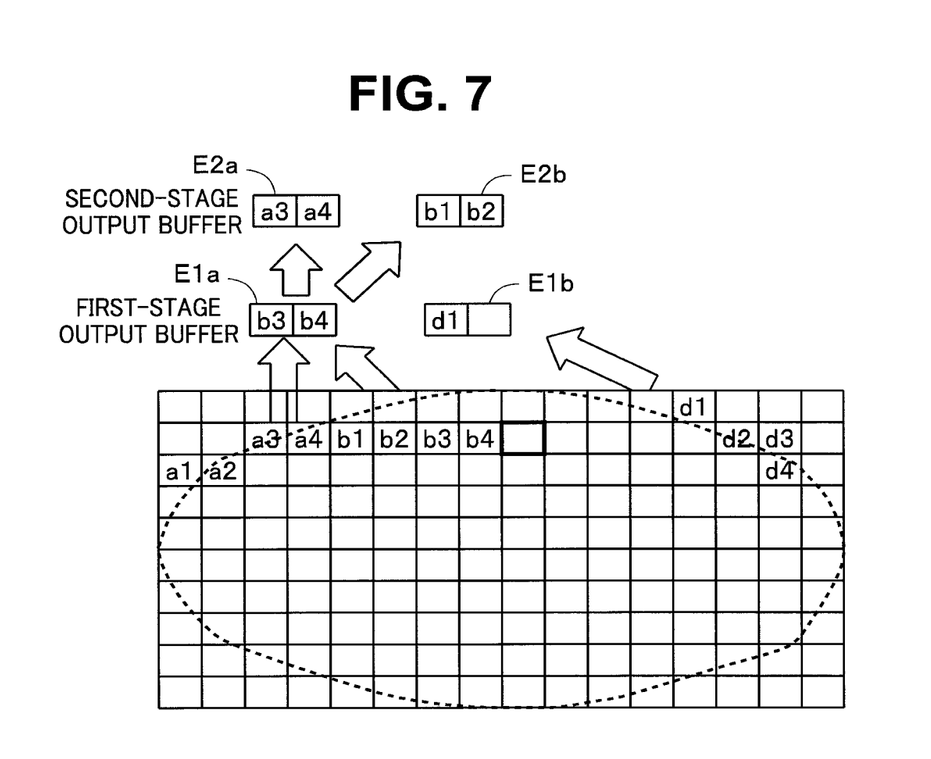
FIG. 7 is an explanatory diagram for explaining writing in and reading from an output buffer in a case of being multilayered.

Next, a reason that use efficiency of an output buffer can be improved by the multilayered output buffers 32 and 33 in the embodiment will be described with reference to FIG. 6 and FIG. 7. FIG. 6 shows writing in and reading from an output buffer in a case of not being multilayered, and FIG. 7 shows writing in and reading from an output buffer in a case of being multilayered.

For simplicity of the explanation, FIG. 6 and FIG. 7 will be explained assuming that a picked-up image from the image pickup unit 22 has 16 pixels in the horizontal direction, and a transmission unit to the DRAM 24 is four pixels. The examples in FIG. 6 and FIG. 7 show that as a result of generation of barrel-shaped distortion shown by a dashed line due to influence of aberration of the optical system of the image pickup unit 22 or the like, an image in which respective pixels which would otherwise be on a first line of an image are moved to positions of pixels a1-a4, b1-b4, c1-c4, and d1-d4 in FIG. 6 and FIG. 7 has been inputted to the distortion correction circuit 1. Each pixel from the image pickup unit 22 is inputted to the distortion correction circuit 1 in raster scan order, is subjected to image processing in order of inputted pixels, and is given to an output buffer.

The example in FIG. 6 shows an example in which the output buffer is not layered, and has three areas D1-D3 for four pixels which are a transmission unit. In the example in FIG. 6, a pixel to be first inputted to the distortion correction circuit 1 among the pixels a1-a4, b1-b4, c1-c4, and d1-d4 is a pixel d1. The pixel d1 is stored in, for example, an area D3 in the output buffer. When the third pixel a3 from left on a second line and the pixel a4 are sequentially inputted to the distortion correction circuit 1 to be processed, processed pixels a3 and a4 are written at consecutive positions in the area D1. Next, pixels b1-b4 with consecutive corrected pixel positions are sequentially inputted, and the pixels b1-b4 with consecutive corrected pixel positions are sequentially stored in the area D2. When the area D2 has been completely filled, all pixels stored in the area D2 are read to be transferred to the DRAM.

In a state where processing has proceeded to a pixel in a thick frame in FIG. 6, the area D2 is transferred after filling completion to enter an empty state, while the area D1 does not enter a filled state until the first and second pixels a1 and a2 from left on the third line are processed, and the area D3 does not enter a filled state until the second pixel d4 from right on the third line is processed. That is, regardless of the output buffer having free spaces, the free spaces are not used, resulting in a low use efficiency state.

The example in FIG. 7 shows an example in which an output buffer is multilayered to two stages, and shows an example in which a first-stage output buffer is composed of areas E1a and E1b corresponding to the output buffer 32, and a second-stage output buffer is composed of areas E2a and E2b corresponding to the output buffer 33. Any of the areas E1a, E1b, E2a, and E2b has a capacity of two pixels.

The pixel d1 first inputted to the distortion correction circuit 1 among the pixels a1-a4, b1-b4, c1-c4, and d1-d4 is stored in, for example, the area E1b in the first-stage output buffer. When the third pixel a3 from left on the second line and the pixel a4 are sequentially inputted to the distortion correction circuit 1 to be processed, processed pixels a3 and a4 are written at positions in the area E1a. When the area E1a has been completely filled, the controller 31 transfers the pixels a3 and a4 in a sub-block stored in the area E1a to, for example, the area E2a in the second-stage output buffer for storage to bring the area E1a into an empty state.

Next, the pixels b1-b4 with consecutive corrected pixel positions are sequentially inputted. First, the pixels b1 and b2 are written in the area E1a, and further transferred to the area E2b by the controller 31. Furthermore, the controller 31 writes the pixels b3 and b4 in the empty area E1a. When the area E2b composing the second-stage output buffer has been completely filled, and the area in the first-stage output buffer has been completely filled with pixels with corrected pixel positions consecutive to the pixels stored in the area E2b, the controller 31 transfers the pixels in the two areas, that is, all pixels in a transmission block stored in the areas E2b and E1a to the DRAM 24 via the bus 23. Thus, the areas E1a and E2b become empty areas.

That is, in a state where processing has proceeded to a pixel shown in a thick frame in FIG. 7, the first-stage output buffer E1a is an empty area, and it is possible to write a pixel for which distortion correction processing has been ended next. That is, the example in FIG. 7 is improved in use efficiency of an output buffer as compared to the example in FIG. 6. As a result, in the example in FIG. 7, it is possible to configure a buffer circuit with a total output buffer size (corresponding to 2×4=8 pixels) less than a total output buffer size in FIG. 6 (corresponding to 4×3=12 pixels).

In the barrel-shaped distortion shown in FIG. 6 and FIG. 7, distortion is smaller as the center of the image is closer, and distortion is larger as the four corners of the image are closer. Therefore, in the neighborhood of the center of the image, each pixel is outputted in substantially same order as the input order to the distortion correction circuit 1, and each area E1 in the first-stage buffer has a relatively high filling speed to be completely filled in a relatively short time period. Conversely, in the neighborhood of the four corners of the image, the input order of each pixel to the distortion correction circuit 1 is relatively largely different from the output order, and each area E1 of the first-stage buffer has a relatively low filling speed to require a relatively long time period until being completely filled.

If no distortion exists or uniform distortion exists over the entire image, multilayering of an output buffer produces no effect. However, when non-uniform distortion is generated depending on positions on an image like barrel-shaped distortion, buffer filling speed becomes non-uniform depending on pixel positions. Therefore, by making the buffer size of the first-stage buffer relatively small, it is possible not only to enhance buffer use efficiency by pixels at pixel positions with high filling speed, but also to suppress decrease in buffer use efficiency by pixels at pixel positions with low filling speed. Thus, it is possible to reduce a total buffer size and improve transmission efficiency. Note that according to a rule of thumb, a configuration is preferable in which the number of the areas E1 in the first-stage output buffer 32≥the number of the areas E2 in the second-stage output buffer 33. When an output buffer is layered with three or more stages, the number of first-stage output buffers≥the number of second-stage output buffers≥the number of third-stage output buffers≥ . . . .

Figure 8A:
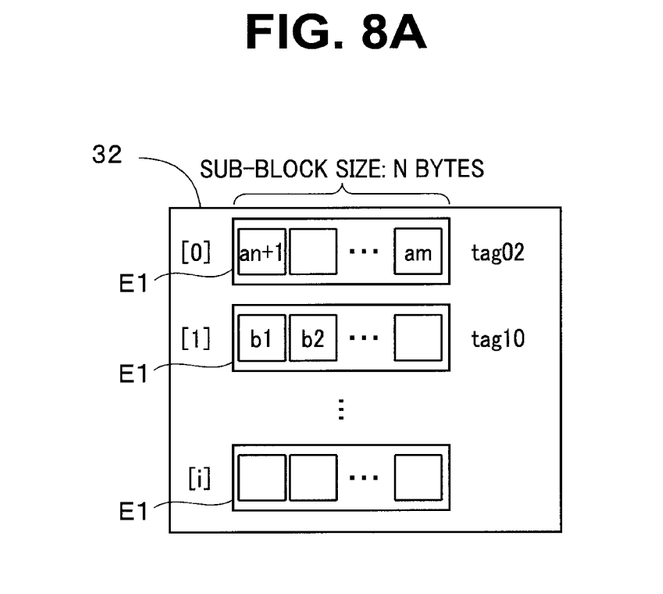
FIG. 8A is an explanatory diagram for explaining operation of the output buffer 32 in FIG. 1.
Figure 8B:
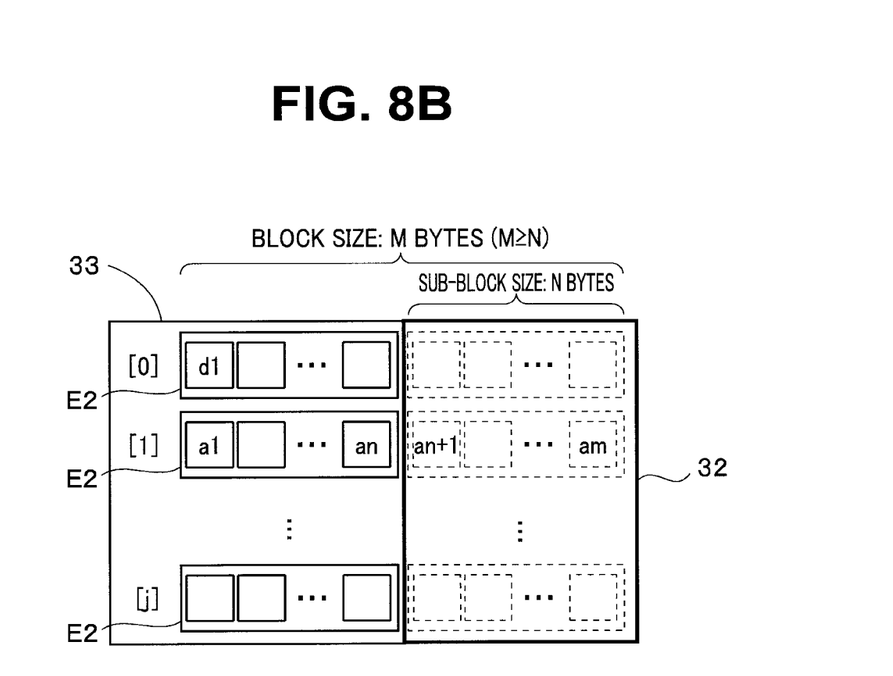
FIG. 8B is an explanatory diagram for explaining operation of the output buffer 33 in FIG. 1.

FIG. 8A and FIG. 8B are explanatory diagrams for explaining operation of the buffer circuit 3 in further detail. FIG. 8A shows operation of the output buffer 32, and FIG. 8B shows operation of the output buffer 33.

FIG. 8A shows the output buffer 32, and shows that a plurality of areas E1 shown by [0], [1], . . . [i] for storing pixels of sub-blocks (hereinafter referred to as areas E1[0], E1[1], . . . E1[i] when the areas need to be distinguished) each have a capacity of N bytes, and tag information is attached to each area E1. That is, in the example of FIG. 8A, the output buffer 32 has (i+1) areas E1. Note that in each area E1, when a pixel is stored, tag information corresponding to the pixel position of the pixel is attached and stored.

Since a series of pixels with consecutive corrected pixel positions (pixels of a sub-block) are stored in the areas E1 and E2, one piece of tag information can be attached to one area E1, E2 to specify the pixel positions of the sub-block stored in each area E1, E2, and it is not necessary to attach an address to each storage area of each pixel in the area E1, E2.

FIG. 8B shows the output buffer 33, and shows that a plurality of areas E2 shown by [0], [1], . . . [j] for storing pixels of sub-blocks (hereinafter referred to as areas E2[0], E2[1], . . . E2[j] when the areas need to be distinguished) each have a capacity of N bytes. That is, in the example of FIG. 8B, the output buffer 33 has (j+1) areas E2. Also in the output buffer 33, tag information is attached to each area E2. Note that in each area E2, when pixels are transferred from the output buffer 32, tag information attached corresponding to the transferred sub-block is stored.

The controller 31 manages transfer of pixels from the output buffer 32 to the output buffer 33 using tag information. Thus, the controller 31 can output a series of pixels of a transmission block with consecutive corrected pixel positions stored in areas E1 and E2 which are two sub-blocks, with tag information indicating an image position attached. An output from the buffer circuit 3 is given to the DRAM 24 via the bus 23 to be stored.

In the examples of FIG. 8A and FIG. 8B, among a series of pixels a1, . . . , an, an+1, . . . , am with consecutive corrected pixel positions composing a transmission block, at first, pixels a1, a2, . . . , an are assumed to be stored in a predetermined area E1 in the output buffer 32. In the present case, tag information tag02 corresponding to image positions of pixels a1, a2, . . . , an is attached and stored in the area E1. When the area E1 has been completely filled, the controller 31 transfers the pixels a1, a2, . . . , an of the sub-block to an area E2 in the output buffer 33, for example, to an area E2[1] for storage.

Next, the pixels an+1, . . . , am with corrected pixel positions consecutive with the pixels a1, a2, . . . , an are assumed to be written in an area E1 in the output buffer 32, for example, in an area E1[0]. In the present case, tag information tag01 indicating that image positions are consecutive with the tag information tag02 of the area E2[1] is attached to the area E1[0] to be stored. When the area E1[0] has been completely filled with the pixels an+1, . . . , am, the controller 31 uses the tag information to read pixels of a transmission block stored in the area E2[1] in the output buffer 33 and the area E1[0] in the output buffer 32, that is, a series of pixels a1, a2, . . . , an, an+1, . . . , am with consecutive corrected pixel positions for transfer to the DRAM 24 via the bus 23. In the present case, the controller 31 attaches tag information tag0 corresponding to image positions of the pixels a1, a2, . . . , an, an+1, . . . , am.

Note that FIG. 8A and FIG. 8B show an example in which both the sizes (capacity) of sub-blocks stored in areas E1 and E2 are N bytes (n pixels), a transmission block size M=2N, and m=2n. However, it is also possible to transmit pixels of a transmission block composed of a sub-block of N bytes (n pixels) stored in an area E2 and a sub-block smaller than N bytes stored in an area E1, and in the present case, M≥N.

Regarding i and j corresponding to the numbers of the areas E1 and E2, i≥j.

Note that in the description using FIG. 8A and FIG. 8B, although description has been made that tag information attached corresponding to a transferred sub-block is stored in the second-stage output buffer 33, when a positional relationship on the image is clear between a sub-block stored in the output buffer 33 and a sub-block stored in the first-stage output buffer 32 corresponding to the sub-block, tag information indicating an image position corresponding to a transmission block may be stored in the output buffer 33.

(Evaluation)

When a predetermined fish-eye lens is adopted as an optical system of the image pickup unit 22, capacity of an output buffer necessary for distortion correction was evaluated.

A case was simulated in which a transmission block size which is a transmission unit to the DRAM 24 via the bus 23 is set to 128 bytes, and output buffer capacities necessary for distortion correction were calculated in a case of configuring an output buffer with one stage as in FIG. 6, and a case of configuring an output buffer with two stages as in FIG. 7. Note that it is assumed that one pixel is 16-bit data, and one transmission block is a set of 64 pixels.

According to the simulation, when the output buffer is configured with one stage, it is necessary to use an output buffer having 1001 areas (hereinafter also referred to as entries) for storing one transmission block (128 bytes) for distortion correction. That is, the output buffer size in the case is 1001×128 bytes=125 Kbytes.

In contrast, when the output buffer is configured with two stages, it suffices to use an output buffer 32 having 447 areas (entries) E1 for storing one sub-block (64 bytes) and an output buffer 33 having 232 areas (entries) E2 for storing one sub-block (64 bytes) for distortion correction. The output buffer size in the case is 447×64 bytes+232×64 bytes=42 Kbytes.

That is, in the example, by multilayering an output buffer, it is possible to reduce a total size of the output buffer to about ⅓. Note that if the total size of the output buffer is not changed, by multilayering the output buffer, it is possible to increase a transmission block size to improve transmission efficiency.

Thus, in the embodiment, it is possible to use the fact that filling speed of an output buffer is different depending on a position on an image based on a shape of distortion to multilayer the output buffer to a plurality of stages, and set the number of buffers (the number of entries) and buffer sizes at each stage to appropriate values to reduce buffer memory capacity and improve transmission efficiency.

Implementation Example

Figure 9:
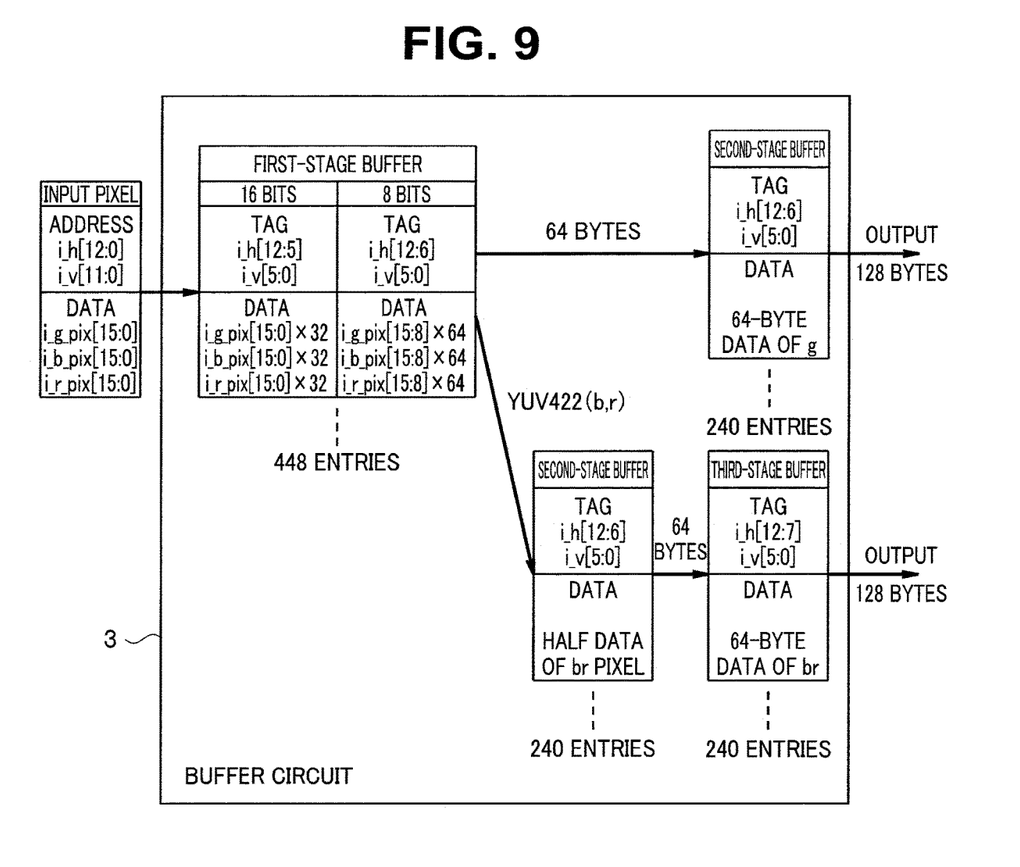
FIG. 9 is an explanatory diagram showing an implementation example of the buffer circuit 3.

FIG. 9 is an explanatory diagram showing an implementation example of the buffer circuit 3 corresponding to the above (Evaluation) section. In the example of FIG. 9, a transmission block size is 128 bytes, a size of an entry in a first-stage buffer corresponding to an area E1 in the output buffer 32 is 64 bytes, and a size of an entry in a second-stage buffer corresponding to an area E2 in the output buffer 33 is 64 bytes. Corresponding to the description in the (Evaluation) section, the number of buffers (the number of entries) in the first-stage buffer is at most 448 entries, and the number of buffers (the number of entries) in the second-stage buffer is at most 240 entries. Note that FIG. 9 shows only one entry surrounded by a frame for each stage. Writing and reading control shown in FIG. 9 is realized by the controller 31.

When a YUV422 planar format is adopted, an output data width of UV pixels (br) is 32 bytes which are half of a Y pixel (g). In FIG. 9, a second-stage buffer and a third-stage buffer are prepared for UV pixels, a sub-block of 64 bytes having two consecutive sub-blocks of 32 bytes is created by the second-stage buffer, and a transmission block of 128 bytes having two consecutive sub-block of 64 bytes is generated by the third-stage buffer. Note that both the numbers of the entries in the second-stage and third-stage buffers for UV pixels are at most 240.

Although FIG. 9 shows an example of one pixel being 16-bit data, regarding the first-stage buffer, a case of one pixel being 8-bit data is also illustrated for reference. Note that FIG. 9 shows that representation of [y:x] indicates data in a bit range from an x-th bit on a lower side to a y-th bit on an upper side.

An input pixel to the buffer circuit 3 has a horizontal address i_h[12:0] of 13 bits indicating a corrected pixel position in the horizontal direction, and a vertical address i_v[11:0] of 12 bits in the vertical direction. Note that an input pixel is data in which G, B, R components i_g_pix [15:0], i_b_pix[15:0], and i_r_pix[15:0] each have 16 bits. Since one pixel is 16-bit data, each entry in the first-stage buffer of 64 bytes stores sub-block data for 32 pixels with consecutive corrected pixel positions.

Tag information for specifying an image position is attached to each sub-block stored in one entry in the first-stage buffer. That is, it suffices to set one piece of tag information for 32 input pixels composing a sub-block, and upper 8 bits except lower 5 bits of a horizontal address representing 32 input pixels, that is, i_h[12:5] are used as tag information in the horizontal direction. Note that in order to reduce capacity necessary to store tag information in each buffer, a vertical address used as tag information is set to lower 6 bits i_v[5:0] of an input pixel. Note that in the present case, it is impossible to respond to distortion in which vertical addresses are apart by 64 or more within consecutive 64 bytes.

When one pixel is 8-bit data, each entry in the first-stage buffer of 64 bytes stores sub-block data for 64 pixels with consecutive corrected pixel positions. In the present case, it suffices to set one piece of tag information for 64 input pixels composing a sub-block, and upper 7 bits except lower 6 bits of a horizontal address representing 64 input pixels, that is, i_h[12:6] are used as tag information in the horizontal direction. Note that tag information in the vertical direction is set to lower 6 bits i_v[5:0] of the input pixel.

When each entry in the first-stage buffer has been completely filled with a sub-block, a sub-block of g of 64 bytes is transferred to the second-stage buffer to be stored. Furthermore, when a sub-block composing a transmission block together with a sub-block stored in the second-stage buffer is stored in any entry in the first-stage buffer, a transmission block of 128 bytes in which the sub-blocks stored in the second-stage buffer and the first-stage buffer are concatenated is outputted. The output of the second-stage buffer is given i_h[12:6] and i_v[5:0] which are tag information corresponding to an image position.

Note that 64 bytes composing a sub-block are collectively read from the first-stage buffer. However, an entry in the first-stage buffer from which a sub-block is read may be continuously given writing data, and in the present case, no room may be left for reading after writing. When last data of a sub-block is inputted to a predetermined entry in the first-stage buffer, the controller 31 may read data of the sub-block before writing the data, and overwrite the read data with the inputted last data for output.

Figure 10:
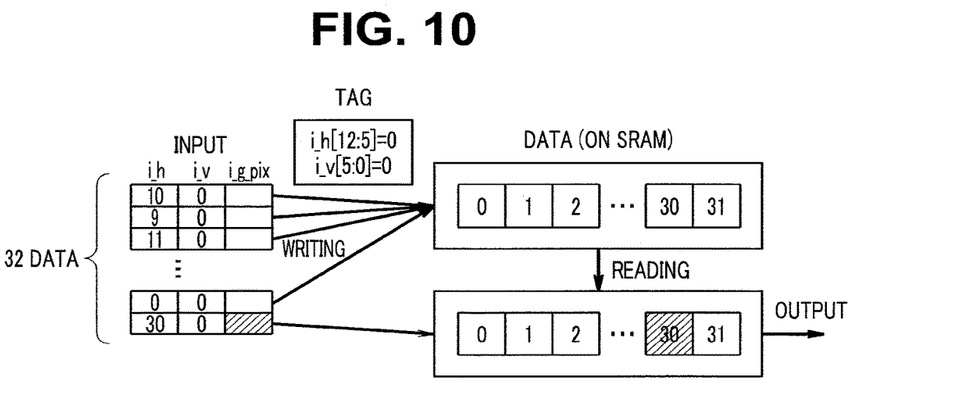
FIG. 10 is an explanatory diagram for explaining operation of the implementation example in FIG. 9.

FIG. 10 is an explanatory diagram showing the operation. FIG. 10 shows an example in which one pixel has 16 bits, and a sub-block is composed of 32 pixels at horizontal pixel positions (0)-(31) having consecutive corrected pixel positions. Pixels are inputted to a predetermined entry in the first-stage buffer in order of horizontal pixel positions (10), (9), (11), . . . , and a pixel (shaded part) at a horizontal pixel position (30) is inputted as a last pixel composing the sub-block. When the pixel at the horizontal pixel position (30) is inputted, data of the sub-block is read from the entry before writing the pixel, and is overwritten with data of the inputted pixel at the horizontal pixel position (30) at a corresponding data position to be outputted as shown in the shaded part in the output sub-block.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. An image processing apparatus comprising:
a distortion correction circuit to which a plurality of pixels composing an input image are inputted in raster scan order, and which is configured to
perform a correction operation for correcting positions of the plurality of pixels based on distortion of the input image to calculate corrected pixels, by
calculating corrected pixel positions which are positions of the pixels to be outputted by the correction operation, from input pixel positions which are positions of the inputted pixels,
calculating, by an operation, pixel positions of the input image corresponding to the calculated corrected pixel positions and corresponding to pixel positions of a plurality of pixels in a periphery of the calculated corrected pixel positions,
calculating the corrected pixels, which correspond to the calculated pixel positions of the input image,
attach information on the corrected pixel positions obtained as a result of the correction operation to calculate the corrected pixels, and
output the corrected pixels to which the information on the corrected pixel positions is attached;
a plurality of output buffers layered to two or more stages to which an output of the distortion correction circuit is inputted in a random order based on the information on the corrected pixel positions, and which are configured to output corrected pixels for each transmission block which is a set of corrected pixels with consecutive corrected pixel positions; and
a controller configured to write an output pixel of the distortion correction circuit in a first-stage output buffer of the plurality of output buffers, sequentially transfer the written output pixel to a post-stage output buffer, and cause output buffers at respective stages to store pixels of sub-blocks into which each transmission block is divided.

2. The image processing apparatus according to claim 1, wherein
the plurality of output buffers layered to two or more stages include a smaller number of output buffers at a later stage.

3. The image processing apparatus according to claim 2, wherein
the plurality of output buffers layered to two or more stages include an output buffer for luminance and an output buffer for chrominance, and a number of stages of the output buffer for chrominance is larger than a number of stages of the output buffer for luminance.

4. The image processing apparatus according to claim 1, wherein
the plurality of output buffers layered to two or more stages include an output buffer for luminance and an output buffer for chrominance, and a number of stages of the output buffer for chrominance is larger than a number of stages of the output buffer for luminance.

5. The image processing apparatus according to claim 1, wherein
when one of the output buffers is filled with pixels of one of the sub-blocks, the controller transfers the pixels of the sub-block filled to a post-stage output buffer, and when the output buffers at respective stages are filled with pixels of a plurality of sub-blocks composing a transmission block, the controller outputs pixels of the transmission block in which the sub-blocks at respective stages filled are concatenated.

6. The image processing apparatus according to claim 1, wherein
the controller gives each of the sub-blocks tag information for specifying an image position.

7. The image processing apparatus according to claim 6, wherein
the controller gives tag information for specifying an image position for one of the sub-blocks written in the first-stage output buffer of the plurality of output buffers.

8. The image processing apparatus according to claim 6, wherein
the controller generates the tag information using upper bits of horizontal pixel position data included in the corrected pixel positions.

9. The image processing apparatus according to claim 1, wherein
before a last pixel composing one of the sub-blocks is written in one of the output buffers, the controller reads data of the sub-block from the output buffer, overwrites the read data of the sub-block with the last pixel at a corresponding data position, and outputs the last pixel.

10. An image processing method comprising:
inputting a plurality of pixels composing an input image in raster scan order,
performing a correction operation for correcting positions of the plurality of pixels based on distortion of the input image to calculate corrected pixels, by
calculating corrected pixel positions which are positions of the pixels to be outputted by the correction operation, from input pixel positions which are positions of the inputted pixels,
calculating, by an operation, pixel positions of the input image corresponding to the calculated corrected pixel positions and corresponding to pixel positions of a plurality of pixels in a periphery of the calculated corrected pixel positions,
calculating the corrected pixels, which correspond to the calculated pixel positions of the input image,
attaching information on the corrected pixel positions obtained as a result of the correction operation to calculate the corrected pixels,
outputting the corrected pixels to which the information on the corrected pixel positions is attached; and
writing a corrected pixel outputted in a random order based on the information on the corrected pixel positions in a first-stage output buffer of a plurality of output buffers layered to two or more stages, sequentially transferring the written corrected pixel to a post-stage output buffer to cause output buffers at respective stages to store pixels of sub-blocks which are a set of corrected pixels with consecutive corrected pixel positions, and outputting pixels of a transmission block in which a plurality of sub-blocks stored in the output buffers at respective stages are concatenated.

11. An image processing apparatus comprising:
a distortion correction circuit to which a plurality of pixels composing an input image are inputted in raster scan order, and which is configured to perform a correction operation for correcting positions of the plurality of pixels based on distortion of the input image to calculate corrected pixels,
a plurality of output buffers layered to two or more stages to which an output of the distortion correction circuit is inputted in a random order based on information on the corrected pixel positions, and which are configured to output corrected pixels for each transmission block which is a set of corrected pixels with consecutive corrected pixel positions; and
a controller configured to write an output pixel of the distortion correction circuit in a first-stage output buffer of the plurality of output buffers, sequentially transfer the written pixel to a post-stage output buffer, and cause output buffers at respective stages to store pixels of sub-blocks into which each transmission block is divided,
wherein the plurality of output buffers layered to two or more stages include a smaller number of output buffers at a later stage.

12. The image processing apparatus according to claim 11, wherein the plurality of output buffers layered to two or more stages include an output buffer for luminance and an output buffer for chrominance, and a number of stages of the output buffer for chrominance is larger than a number of stages of the output buffer for luminance.

13. The image processing method according to claim 10, wherein the plurality of output buffers layered to two or more stages include an output buffer for luminance and an output buffer for chrominance, and a number of stages of the output buffer for chrominance is larger than a number of stages of the output buffer for luminance.

14. The image processing apparatus according to claim 11, wherein when one of the output buffers is filled with pixels of one of the sub-blocks, the controller transfers the pixels of the sub-block filled to a post-stage output buffer, and when the output buffers at respective stages are filled with pixels of a plurality of sub-blocks composing the transmission block, the controller outputs pixels of the transmission block in which the sub-blocks at respective stages filled are concatenated.

15. An image processing apparatus comprising:
a distortion correction circuit to which a plurality of pixels composing an input image are inputted in raster scan order, and which is configured to perform a correction operation for correcting positions of the plurality of pixels based on distortion of the input image to calculate corrected pixels,
a plurality of output buffers layered to two or more stages to which an output of the distortion correction circuit is inputted in a random order based on information on the corrected pixel positions, and which are configured to output corrected pixels for each transmission block which is a set of corrected pixels with consecutive corrected pixel positions; and a controller configured to write an output pixel of the distortion correction circuit in a first-stage output buffer of the plurality of output buffers, sequentially transfer the written output pixel to a post-stage output buffer, and cause output buffers at respective stages to store pixels of sub-blocks into which each transmission block is divided, wherein the controller gives tag information for specifying an image position for one of the sub-blocks written in the first-stage output buffer of the plurality of output buffers.

16. The image processing apparatus according to claim 15, wherein the controller generates the tag information using upper bits of horizontal pixel position data included in the corrected pixel positions.

* * * * *